(12) United States Patent
Hamilton et al.

(10) Patent No.: US 12,450,881 B2
(45) Date of Patent: Oct. 21, 2025

(54) TRAINING AND USING A LEARNING ALGORITHM USING A TRANSCRIPT OF AUDIO DATA FOR IDENTIFICATION OF A MEDICAL DEVICE VISIBLE IN IMAGE DATA

(71) Applicant: Brainlab AG, Munich (DE)

(72) Inventors: Christoffer Hamilton, Aschheim (DE); Juliane Weinzierl, Munich (DE)

(73) Assignee: BRAINLAB AG, Munich (DE)

( * ) Notice: Subject to any disclaimer, the term of this patent is extended or adjusted under 35 U.S.C. 154(b) by 275 days.

(21) Appl. No.: 18/035,790

(22) PCT Filed: Dec. 7, 2021

(86) PCT No.: PCT/EP2021/084614
§ 371 (c)(1),
(2) Date: May 8, 2023

(87) PCT Pub. No.: WO2022/128638
PCT Pub. Date: Jun. 23, 2022

(65) Prior Publication Data
US 2024/0013518 A1    Jan. 11, 2024

(30) Foreign Application Priority Data

Dec. 18, 2020 (WO) .................. PCT/EP2020/086957

(51) Int. Cl.
*G06V 10/774* (2022.01)
*G06V 10/82* (2022.01)
(Continued)

(52) U.S. Cl.
CPC ............ *G06V 10/774* (2022.01); *G06V 10/82* (2022.01); *G10L 25/30* (2013.01); *G10L 25/54* (2013.01)

(58) Field of Classification Search
None
See application file for complete search history.

(56) References Cited

U.S. PATENT DOCUMENTS

| | | | |
|---|---|---|---|
| 8,502,876 B2 * | 8/2013 | Wang | G16H 30/40 348/222.1 |
| 2020/0273560 A1 | 8/2020 | Wolf et al. | |

(Continued)

FOREIGN PATENT DOCUMENTS

| | | |
|---|---|---|
| WO | 2022128118 A1 | 6/2022 |
| WO | 2022128638 A1 | 6/2022 |

OTHER PUBLICATIONS

Chen et al., "Surgical Instruments Tracking Based on Deep Learning with Lines Detection and Spatio-Temporal Context", 4 pages. Retrieved on: May 2023.

(Continued)

*Primary Examiner* — Leon Flores
(74) *Attorney, Agent, or Firm* — Gray Ice Higdon

(57) ABSTRACT

Disclosed are computer-implemented methods of training a learning algorithm on the basis of audio and image data which has been pre-processed to generate a time-synchronized transcript of the audio information and the image information to allow the learning algorithm to identify a medical device such as a medical instrument or a medical instrument on an instrument table which is visible in the image data and output corresponding information to a user. Embodiments include additional prediction of a next instrument to be used and a counting of instruments which have been used.

23 Claims, 7 Drawing Sheets

(51) Int. Cl.
*G10L 25/30* (2013.01)
*G10L 25/54* (2013.01)

(56) References Cited

U.S. PATENT DOCUMENTS

| | | |
|---|---|---|
| 2020/0303065 A1 | 9/2020 | Venkataraman |
| 2020/0367974 A1 | 11/2020 | Khalid et al. |
| 2023/0134195 A1* | 5/2023 | Hawkins ................ G16H 20/40 386/241 |

OTHER PUBLICATIONS

Ward et al., "Computer vision in surgery" Surgery 169, pp. 1253-1256, Elsevier, dated Oct. 10, 2020.
International Search Report and Written Opinion issued for Application No. PCT/EP20021/084614, 18 pages, dated Mar. 25, 2022.

* cited by examiner

TRAINING AND USING A LEARNING ALGORITHM USING A TRANSCRIPT OF AUDIO DATA FOR IDENTIFICATION OF A MEDICAL DEVICE VISIBLE IN IMAGE DATA

FIELD OF THE INVENTION

The present invention relates to a computer-implemented method of training a learning algorithm to determine the identity of a medical device and a computer-implemented method of determining the identity of a medical device using the trained learning algorithm, corresponding computer programs, computer-readable storage media storing such a program and computers executing the program, as well as medical systems comprising an electronic data storage device and the aforementioned computers.

TECHNICAL BACKGROUND

In the operating room, optical instrument recognition and tracking is a technology used for computer assisted surgery. With the help of machine learning, the process of instrument identification can be automated for situational surgical instrument tray tracking. Appropriate data pre-processing allows for universal and flexible possible uses.

So far, the instrument type has to be either input manually once it was picked up by the user, can be identified by the type of optical markers used for tracking, can be identified by determining its shape and comparison to a database of instrument shapes, can be identified by reading a dedicated marker pattern (e.g. a barcode or a QR code) and comparing it to a database where the marker-instrument identity is stored, or can be identified upon a clearly assignable audio signal (e.g. speech recognition, keyword spotting).

However, this is associated with the following constraints:

A manual input step which has to be conducted once the instrument is picked up hinders a seamless workflow.

All known methods need a predefined database of the instrument shapes or dedicated marker pattern; these databases do not exist consistently and do not allow for situational actions.

Pure voice control is not generic enough to make the system work for every situation.

Manual medical device monitoring is error prone.

The present invention has the object of providing an improved means of instrument identification and/or monitoring.

The present invention can be used for procedures e.g. in connection with a system for image-guided surgery or video routing such as Curve®, Buzz® and Kick®, all products of Brainlab AG.

Aspects of the present invention, examples and exemplary steps and their embodiments are disclosed in the following. Different exemplary features of the invention can be combined in accordance with the invention wherever technically expedient and feasible.

Exemplary Short Description of the Invention

In the following, a short description of the specific features of the present invention is given which shall not be understood to limit the invention only to the features or a combination of the features described in this section.

The disclosed methods encompass training a learning algorithm on the basis of audio and image data which has been pre-processed to generate a time-synchronized transcript of the audio information and the image information to allow the learning algorithm to identify a medical device such as a medical instrument or a medical instrument on an instrument table which is visible in the image data and output corresponding information to a user. Embodiments include additional prediction of a next instrument to be used and a counting of instruments which have been used. The disclosed methods also encompass using the trained algorithm for i.a. identification of a medical device.

General Description of the Invention

In this section, a description of the general features of the present invention is given for example by referring to possible embodiments of the invention.

In general, the invention reaches the aforementioned object by providing, in a first aspect, a computer-implemented medical method of training a learning algorithm to determine the identity of a medical device. The method comprises executing, on at least one processor of at least one computer (for example at least one computer being part of a navigation system), the following exemplary steps which are executed by the at least one processor.

In a (for example first) exemplary step, training audio data is acquired which describes an audio identifier which describes the identity of the medical device. The medical device is for example a medical instrument or any other device which is used in a medical environment.

In a (for example second) exemplary step, training image data is acquired which describes a series of temporally subsequent digital images comprising a visual identifier which describes the identity of the medical device.

In a (for example third) exemplary step, training audio meta data is determined based on the training audio data, wherein the training audio meta data describes a training transcript of the audio identifier. For example, the training transcript comprises at least one of information about the phonetic signal, for example information that a phonetic signal has been detected, the phonetic signal, a string variable, information on the direction of origin of the phonetic signal, information about a person causing the phonetic signal.

In a (for example fourth) exemplary step, device label data is acquired which describes a label associated with at least one of the audio identifier and the visual identifier, wherein the label describes the identity of the medical device.

In a (for example fifth) exemplary step, label identity data is determined which describes model parameters of the learning algorithm for establishing a relation between the visual identifier and the audio identifier and the label, wherein the label identity data is determined by inputting the training audio meta data and the device label data into a function which establishes the relation. For example, the label identity data describes a counter indicating use of the medical device.

In an example, the method according to the first aspect comprises a step in which training visual meta data is acquired which describes a use state of the medical device in each of the digital images. For example, the label identity data is determined by inputting the training visual meta data into the function which establishes the relation.

In an example of the method according to the first aspect, the training visual meta data is determined based on the training image data, wherein the training transcript and the visual identifier are time-synchronized and the training transcript is associated with the visual identifier, wherein the label identity data is determined by inputting the training visual meta data into the function.

In an example of the method according to the first aspect, medical device order data describing a predetermined order of use of a plurality of medical devices is acquired. The label identity data is then determined based on the medical device order data. Thereby, the medical device can be identified according to its order of use among the use of the plurality of medical devices. For example, the label identity data then describes a prediction of another medical device to be used. The device identity data then describes another medical device to be used.

In a second aspect, the invention relates to a computer-implemented method of determining a relation between a visual identifier, and audio identifier and a label, the visual identifier, audio identifier and label identifying a medical device. The method comprises executing, on at least one processor of at least one computer (for example at least one computer being part of a navigation system), the following exemplary steps which are executed by the at least one processor.

In a (for example first) exemplary step, audio data is acquired which describes the audio identifier.

In a (for example second) exemplary step, image data is acquired which describes a series of temporally subsequent digital images comprising the visual identifier.

In a (for example third) exemplary step, audio meta data is determined based on the audio data, wherein the audio meta data describes a transcript of the audio identifier, wherein the transcript and the image data are time-synchronized and the audio identifier is associated with the visual identifier.

In a (for example fourth) exemplary step, device identity data is determined which describes a relation between the visual identifier and the audio identifier, wherein the device identity data is determined by inputting the audio meta data into a function which establishes the relation, the function being part of a learning algorithm which has been trained by executing the method according to the first aspect as described above and in the below-mentioned examples 1 to 10.

If the method according to the first aspect comprises training the learning algorithm by inputting the training visual meta data into the function, the method according to the second aspect for example comprises a step in which visual meta data is determined based on the image data, wherein the visual meta data describes a use state of the medical device in each of the digital images. The device identity data is then determined by inputting the visual meta data into the function.

In example 1 of the methods according to the first aspect and the second aspect, the digital images are still images or video images.

In example 2 of the methods according to the first aspect and the second aspect, the audio identifier is or comprises a phonetic signal, for example a human voice signal.

In example 3 of the methods according to the first aspect and the second aspect, the phonetic signal is a human voice signal and wherein the transcript and/or the training transcript is generated by at least one of lingually translating words described by the voice signal, filtering out a keyword described by the voice signal, filtering out a patient identifier described by the voice signal, filtering out health information described by the voice signal, cancelling noise included in the voice signal, determining that a predetermined combination of keywords is described by the voice signal.

In example 4 of the methods according to the first aspect and the second aspect, the visual identifier is an image rendering of the medical device in the digital images. Thereby, the medical device is identified by its appearance in at least one of the digital images.

In example 5 of the methods according to the first aspect and the second aspect, the transcript comprises at least one of information about the phonetic signal, for example information that a phonetic signal has been detected, the phonetic signal, a string variable, information on the direction of origin of the phonetic signal, information about a person causing the phonetic signal.

In example 6 of the methods according to the first aspect and the second aspect, at least one of the digital images comprises an image rendering of the medical device and a support unit, for example a surgical table, for supporting the medical device, the methods according to the first and second aspects then comprise determining the image identifier based comparing the relative position in the at least one digital image between the medical device and the device support unit to a predetermined relative position between the medical device and the device support unit.

In example 7 of the methods according to the first aspect and the second aspect, the use state is defined by at least one of the following:
- a state of cleanliness of the medical device;
- a hand movement of a hand of a user rendered in the digital image;
- a relative position between a hand of a user rendered in at least one of the digital images and the medical device rendered in the at least one of the digital images;
- a relative position between a rendering in at least one of the digital images of information coding the identity of the medical device and a rendering in at least one of the digital images of the medical device, wherein the information coding the identity is for example non-anatomical information (such as a QR code or a bar code);
- a geometry of the medical device, for example its size in a predetermined dimension such as its length, diameter or thickness.

In example 8 of the methods according to the first aspect and the second aspect, a check is conducted to determine on the basis of predetermined statistical information whether the training transcript describes the same medical device as the visual identifier.

In example 9 of the methods according to the first aspect and the second aspect, the learning algorithm comprises or consists of a machine learning algorithm, for example a convolutional neural network.

In example 10 of the methods according to the first aspect and the second aspect, the model parameters define the learnable parameters, for example weights, of the learning algorithm.

In an example of the method according to the second aspect, audio confirmation data is acquired which describes a human voice signal indicating the identity of the medical device. The device identity data is then determined based on the audio confirmation data. This allows for an audio confirmation by a voice signal issued by a user for a correct identification of the medical device.

In an example of the method according to the second aspect, the device identity data describes a value of the counter if the label identity data describes a prediction of another medical device to be used.

In a third aspect, the invention is directed to a computer program comprising instructions which, when the program is executed by at least one computer, causes the at least one computer to carry out method according to the first aspect or the second aspect. The invention may alternatively or additionally relate to a (physical, for example electrical, for example technically generated) signal wave, for example a digital signal wave, such as an electromagnetic carrier wave carrying information which represents the program, for example the aforementioned program, which for example comprises code means which are adapted to perform any or all of the steps of the method according to the first aspect or the second aspect. The signal wave is in one example a data carrier signal carrying the aforementioned computer program. A computer program stored on a disc is a data file, and when the file is read out and transmitted it becomes a data stream for example in the form of a (physical, for example electrical, for example technically generated) signal. The signal can be implemented as the signal wave, for example as the electromagnetic carrier wave which is described herein. For example, the signal, for example the signal wave is constituted to be transmitted via a computer network, for example LAN, WLAN, WAN, mobile network, for example the internet. For example, the signal, for example the signal wave, is constituted to be transmitted by optic or acoustic data transmission. The invention according to the third aspect therefore may alternatively or additionally relate to a data stream representative of the aforementioned program, i.e. comprising the program.

In a fourth aspect, the invention is directed to a computer-readable storage medium on which the program according to the third aspect is stored. The program storage medium is for example non-transitory.

In a fifth aspect, the invention is directed to a computer-readable storage medium on which data defining the model parameters and the architecture of a learning algorithm which has been trained by executing the method according to the first aspect are stored. The program storage medium is for example non-transitory. The invention according to the fifth aspect also relates to a data carrier signal carrying data defining the model parameters and the architecture of a learning algorithm which has been trained by executing the method according to the first aspect and/or a data stream which carries data defining the model parameters and the architecture of a learning algorithm which has been trained by executing the method according to the first aspect.

In a sixth aspect, the invention is directed to at least one computer (for example, a computer), comprising at least one processor (for example, a processor), wherein the program according to the third aspect is executed by the processor, or wherein the at least one computer comprises the computer-readable storage medium according to the fourth aspect.

In a seventh aspect, the invention is directed to a system for determining a relation between a visual identifier, and audio identifier and a label, the visual identifier, audio identifier and label identifying a medical device, the system comprising:
   a) the at least one computer according to the sixth aspect;
   b) at least one electronic data storage device storing the image data and the audio data; and
   c) the program storage medium according to the fifth aspect,
   wherein the at least one computer is operably coupled to
      the at least one electronic data storage device for acquiring, from the at least one electronic data storage device, the image data and the audio data, and for storing, in the at least one electronic data storage device, at least the device identity data; and
   the program storage medium for acquiring, from the program storage medium, the data defining the model parameters and the architecture of the learning algorithm.

In an eighth aspect, the invention is directed to a medical system for determining a relation between a visual identifier, and audio identifier and a label, the visual identifier, audio identifier and label identifying a medical device, the system comprising:
   a) the at least one computer according to the sixth aspect, wherein the computer program comprises instructions which, when the program is executed by the at least one computer, causes the at least one computer to carry out method according to the second aspect;
   b) at least one electronic data storage device storing at least data defining the model parameters and the architecture of a learning algorithm which has been trained by executing the method according to the first aspect and the label identity data; and
   c) an imaging device for generating the image data, wherein the at least one computer is operably coupled to
   the at least one electronic data storage device for acquiring, from the at least one data storage device, at least the data defining the model parameters and the architecture of a learning algorithm which has been trained by executing the method according to the first aspect and the label identity data, and
   the imaging device for receiving, from the imaging device, the image data.

In an example of the system according to the eighth aspect, the imaging device is a digital camera such as a digital video camera or a digital still image camera.

The present invention also relates to the use of the systems according to the seventh and eighth aspects for determining a relation between a visual identifier, and audio identifier and a label, the visual identifier, audio identifier and label identifying a medical device.

For example, the invention does not involve or in particular comprise or encompass an invasive step which would represent a substantial physical interference with the body requiring professional medical expertise to be carried out and entailing a substantial health risk even when carried out with the required professional care and expertise.

In the following, an explanation of convolutional neural networks as an example of the learning algorithm to be used with the disclosed invention is provided with reference to FIG. 1.

Convolutional networks, also known as convolutional neural networks, or CNNs, are an example of neural networks for processing data that has a known grid-like topology. Examples include time-series data, which can be thought of as a 1-D grid taking samples at regular time intervals, and image data, which can be thought of as a 2-D or 3-D grid of pixels. The name "convolutional neural network" indicates that the network employs the mathematical operation of convolution. Convolution is a linear operation. Convolutional networks are simply neural networks that use convolution in place of general matrix multiplication in at least one of their layers. There are several variants on the convolution function that are widely used in practice for neural networks. In general, the operation used in a convolutional neural network does not correspond precisely to the definition of convolution as used in other fields, such as engineering or pure mathematics.

The main component of convolutional neural networks are artificial neurons. FIG. 6 is an example of a single neuron depicted. The node in the middle represents a neuron, which takes all inputs ($x_1, \ldots, x_n$) and multiplies them with their specific weights ($w_1, \ldots, w_n$) The importance of the input depends on the value of its weight. The addition of these computed values is called weighted sum which will be inserted into an activation function. The weighted sum z is defined as:

$$z = \Sigma_{i=0}^{n} x_i \cdot w_i \qquad (1)$$

The bias b is an input-independent value which modifies the boundaries of the threshold. The resulting value is processed by an activation function which decides whether the input will be transferred to the next neuron.

A CNN usually takes an order 1 or 3 tensor as its input, e.g., an image with H rows, W columns, and 3 channels (R, G, B colour channels). Higher order tensor inputs, however, can be handled by CNN in a similar fashion. The input then sequentially goes through a series of processing. One processing step is usually called a layer, which could be a convolution layer, a pooling layer, a normalization layer, a fully connected layer, a loss layer, etc. Details of the layers are described in the sections below.

$$x^1 \to \boxed{w^1} \to x^2 \to \ldots \to x^{L-1} \to \boxed{w^{L-1}} \to x^L \to$$
$$\boxed{w^L} \to z \qquad (1)$$

The above equation 5 illustrates how a CNN runs layer by layer in a forward pass. The input is $x^1$, usually an image (order 1 or 3 tensor). We note the parameters involved in the processing of the first layer collectively as a tensor $w^i$. The output of the first layer is $x^2$, which also acts as the input to the second layer processing. This processing proceeds until processing of all layers in the CNN has been finished, which outputs $x^L$. One additional layer, however, is added for backward error propagation, a method that leans good parameter values in the CNN. Suppose the problem at hand is an image classification problem with C classes. A commonly used strategy is to output $x^L$ as a C-dimensional vector, the i-th entry of which encodes the prediction (posterior probability that $x^1$ comes from the i-th class). To make $x^L$ a probability mass function, we can set the processing in the (L−1)-th layer as a softmax transformation of $x^{L-1}$. In other applications, the output $x^L$ may have other forms and interpretations. The last layer is a loss layer. Let us suppose t is the corresponding target (ground-truth) value for the input $x^1$, then a cost or loss function can be used to measure the discrepancy between the CNN prediction $x^L$ and the target t. Note that some layers may not have any parameters, that is, $w^i$ may be empty for some i.

In an example of a CNN, ReLu is used as an activation function for the convolutional layers and the softmax activation function provides information in order to give a classification output. The following sections will explain the purpose of the most important layers.

An input image is input to a feature learning section of a layer comprising convolution and ReLu, followed by a layer comprising pooling, which is followed by further pairwise repetitions of layers of convolution and ReLu and of pooling. The output of the feature learning section is input to a classification section which comprises layers directed to flattening, fully connecting and softmaxing.

In a convolutional layer, multiple convolution kernels are usually used. Assuming D kernels are used and each kernel is of spatial span H×W, we denote all the kernels as f. f is an order 4 tensor in $\mathbb{R}^{H \times W \times D^l \times D}$. Similarly, we use index variables $0 \leq i < H$, $0 \leq j < W$, $0 \leq d^l < D^l$ and $0 \leq d < D$ to pinpoint a specific element in the kernels. Also note that the set of kernels f refers to the same object as the notation $w^L$ above. We change the notation a bit to simplify the derivation. It is also clear that even if the mini-batch strategy is used, the kernels remain unchanged.

The spatial extent of the output is smaller than that of the input so long as the convolution kernel is larger than 1×1. Sometimes we need the input and output images to have the same height and width, and a simple padding trick can be used For every channel of the input, if we pad (i.e., insert)

$$\left\lfloor \frac{H-1}{2} \right\rfloor$$

rows above the first row and $$\left\lfloor \frac{H}{2} \right\rfloor$$

rows below the last row, and paid $$\left\lfloor \frac{W-1}{2} \right\rfloor$$

columns the left of the first column and $$\left\lfloor \frac{W}{2} \right\rfloor$$

columns to the right of the last column of the input, e convolution output will be $H^l \times W^l \times D$ in size, i.e. having the same spatial extent as the input. [*] is the floor function. Elements of the padded rows and columns are usually set to 0, but other values are also possible.

Stride is another important concept in convolution. A kernel is convolved with the input at every possible spatial location, which corresponds to the stride s=1. However, if s>1, every movement of the kernel skip s−1 pixel locations (i.e., the convolution is performed once every s pixel both horizontally and vertically).

In this section, we consider the simple case when the stride is 1 and no padding is used. Hence, we have y (or $x^{l+1}$) in $\mathbb{R}^{H^{l+1} \times W^{l+1} \times D^{l+1}}$, with $H^{l+1} = H^l - H + 1$, $W^{l+1} = W^l - W + 1$, and $D^{l+1} = D$. In precise mathematics, the convolution procedure can be expressed as an equation:

$$y_{i^{l+1}, j^{l+1}, d} = \Sigma_{i=0}^{H} \Sigma_{j=0}^{W} \Sigma_{d^l=0}^{D^l} f_{i,j,d^l,d} \times x^l_{i^{l+1}+i, j^{l+1}+j, d^l} \qquad (2)$$

Equation 2 is repeated for all $0 \leq d \leq D = D^{l+1}$, and for any spatial location ($i^{l+1}, j^{l+1}$) satisfying $0 \leq i^{l+1} < H^l - H + 1 = H^{l+1}$, $0 \leq j^{l+1} < W^l - W + 1 = W^{l+1}$. In this equation, $x^l_{i^{l+1}+i, j^{l+1}+j, d^l}$ refers to the element of $x^l$ indexed by the triplet ($i^{l+1}+i, j^{l+1}+j, d^l$). A bias term $b_d$ is usually added to $y_{i^{l+1}, j^{l+1}, d}$. We omit this term in this note for clearer presentation.

A pooling function replaces the output of the net at a certain location with a summary statistic of the nearby outputs. For example, a max pooling operation reports the maximum output within a rectangular neighbourhood of a table. Other popular pooling functions include the average of a rectangular neighbourhood, the $L_2$ norm of a rectangular neighbourhood, or a weighted average based on the distance from the central pixel. In all cases, pooling helps to make the representation approximately invariant to small translations of the input. Invariance to translation means that if we translate the input by a small amount, the values of the pooled outputs do not change.

Because pooling summarizes the responses over a whole neighbourhood, it is possible to use fewer pooling units than detector units, by reporting summary statistics for pooling regions spaced k pixels apart rather than one pixel apart. This improves the computational efficiency of the network because the next layer has roughly k times fewer inputs to process.

Suppose all the parameters of a CNN model $w^1, \ldots, w^{L-1}$ have been learned, then we are ready to use this model for prediction. Prediction only involves running the CNN model forward, i.e., in the direction of the arrows in equation 1. Take the image classification problem as an example. Starting from the input $x^1$, we make it pass the processing of the first layer (the box with parameters $w^1$), and get $x^2$. In turn, $x^2$ is passed into the second layer, etc. Finally, we receive $x^1 \in \mathbb{R}^C$, which estimates the posterior probabilities of $x^1$ belonging to the C categories. We can output the CNN prediction as:

$$\arg_i \max x_i^L \qquad (3)$$

Now, the problem is: how do we learn the model parameters?

As in many other learning systems, the parameters of a CNN model are optimized to minimize the loss z, i.e. we want the prediction of a CNN model to match the ground-truth labels. Suppose one training example $x^1$ is given for training such parameters.

The training process involves running the CNN network in both directions. We first run the network in the forward pass to get $x^L$ to achieve a prediction using the current CNN parameters. Instead of outputting a prediction, we need to compare the prediction with the target t corresponding to $x^1$, i.e. continue running the forward pass till the last loss layer. Finally, we achieve a loss z. The loss z is then a supervision signal, guiding how the parameters of the model should be modified (updated).

There exist several algorithms for optimizing a loss function and CNNs are not limited to a specific one. An example algorithm is called Stochastic Gradient Descent (SGD). This means the parameters are updated by using the gradient estimated from a (usually) small subset of training examples.

$$w^i \leftarrow w^i - \eta \frac{\delta z}{\delta w^i} \qquad (4)$$

In equation 4, the ←—sign implicitly indicates that the parameters $w^i$ (of the i-layer) are updated from time t to t+1. If a time index t is explicitly used, this equation will look like $$(w^i)^{t+1} = (w^i)^t - \eta \frac{\delta z}{\delta (w^i)^t} \qquad (5)$$

In equation 4, the partial derivative $$\frac{\delta z}{\delta w^i}$$

measures the rate of increase of z with respect to the changes in different dimensions of $w^i$. This partial derivative vector is called the gradient in mathematical optimization. Hence, in a small local region around the current value of $w^i$, to move $w^i$ in the direction determined by the gradient will increase the objective value z. In order to minimize the loss function, we should update $w^i$ along the opposite direction of the gradient. This updating rule is called the gradient descent.

If we move too far in the negative gradient direction, however, the loss function may increase. Hence, in every update we only change the parameters by a small proportion of the negative gradient, controlled by η (the learning rate). η>0 is usually set to a small number (e.g., η=0.001). One update based on $x^1$ will make the loss smaller for this particular training example if the learning rate is not too large. However, it is very possible that it will make the loss of some other training examples become larger. Hence, we need to update the parameters using all training examples. When all training examples have been used to update the parameters, we nay one epoch has been processed. One epoch will in general reduce the average loss on the training set until the learning system overfits the training data. Hence, we can repeat the gradient descent updating epochs and terminate at some point to obtain the CNN parameters (e.g., we can terminate when the average loss on a validation set increases).

The last layer's partial derivatives are easy to compute. Because $x^L$ is connected to z directly under the control of parameters $w^L$, it is easy to compute $$\frac{\delta z}{\delta w^L}.$$

This step is only needed when $w^L$ is not empty. In the same spirit, it is also easy to compute $$\frac{\delta z}{\delta x^L}.$$

For example, if the squared $L_2$ loss is used, we have an empty $$\frac{\delta z}{\delta w^L}, \text{ and } \frac{\delta z}{\delta x^L} = x^L - t.$$

In fact, for every layer, we compute two sets of gradients: the partial derivatives of z with respect to the layer parameters $w^i$, and that layer's input xi. The term $$\frac{\delta z}{\delta w^i},$$

as seen in Equation 4, can be used to update the current (i-th) layer's parameters. The term $$\frac{\delta z}{\delta x^i}$$

can be used to update parameters backwards, e.g., to the (i−1)-th layer. An intuitive explanation is: $x^i$ is the output of the (i−1)-th layer and $$\frac{\delta z}{\delta x^i}$$

is how $x^i$ should be changed to reduce the loss function. Hence, we could view $$\frac{\delta z}{\delta x^i}$$

as the art of the "error" supervision information propagated from z backward till the current layer, in a layer by layer fashion. Thus, we can continue the back propagation process, and use $$\frac{\delta z}{\delta x^i}$$

to propagate the errors backward to the (i−1)-th layer. This layer-by-layer backward updating procedure makes learning a CNN much easier.

Take the i-th layer as an example. When we update the i-th layer, the back propagation process for the (i+1)-th layer must have been finished. That is, we already computed the terms $$\frac{\delta z}{\delta w^{i+1}} \text{ and } \frac{\delta z}{\delta x^{i+1}}.$$

Both are stored in memory and ready for use. Now our task is to compute $$\frac{\delta z}{\delta w^i} \text{ and } \frac{\delta z}{\delta x^i}.$$

Using the chain rule, we have $$\frac{\partial z}{\partial (vec(w^i)^T)} = \frac{\partial z}{\partial (vec(x^{i+1})^T)} \frac{\partial vec(x^{i+1})}{\partial (vec(w^i)^T)},$$

$$\frac{\partial z}{\partial (vec(x^i)^T)} = \frac{\partial z}{\partial (vec(x^{i+1})^T)} \frac{\partial vec(x^{i+1})}{\partial (vec(x^i)^T)},$$

Since $$\frac{\partial z}{\partial x^{i+1}}$$

is already computed and stored in memory, it requires just a matrix reshaping operation (vec) and an additional transpose operation to get $$\frac{\partial z}{\partial vec(x^{i+1})},$$

which is the first term in the right hand side (RHS) of both equations. So long as we can compute $$\frac{\partial vec(x^{i+1})}{\partial (vec(w^i)^T)} \text{ and } \frac{\partial vec(x^{i+1})}{\partial (vec(x^i)^T)},$$

We can easily get what we want (the left hand side of both equations).

$$\frac{\partial vec(x^{i+1})}{\partial (vec(w^i)^T)} \text{ and } \frac{\partial vec(x^{i+1})}{\partial (vec(x^i)^T)}$$

are much easier to compute than directly computing $$\frac{\partial z}{\partial (vec(w^i)^T)} \text{ and } \frac{\partial z}{\partial (vec(x^i)^T)},$$

because $x^i$ is directly related to $x^{i+1}$, through a function with parameters $w^i$.

In the context of neural networks, activations serve as transfer functions between the input of a neuron and the output. They define under which conditions the node is activated, i.e. the input values are mapped to the output which, in hidden layers, serves again as one of the inputs to the succeeding neuron. There exists a vast amount of different activation functions with different characteristics.

A loss function quantifies how well an algorithm models the given data. To learn from the data and in order to change the weights of the network, the loss function has to be minimized. Generally, one can make the distinction between a regression loss and classification loss. Classification predicts output from set of finite categorical values (class labels), and regression, on the other hand, deals with prediction a continuous value.

In the following mathematical formulations, the following parameters are defined as:
  n is the number of training examples
  i is the i-th training example in a data set
  $y_i$ is the ground truth label for the i-th training example
  $\hat{y}_i$ is the prediction for i-th training example The most common setting for classification problems is cross-entropy loss. It increases as the predicted probability diverges from the actual label. The log of the actual predicted probability is multiplied with the ground truth class. An important aspect of this is that cross entropy loss penalizes heavily the predictions that are confident but wrong. The mathematical formulation can be described as:

$$\text{CrossEntropyLoss} = -(y_i \log(\hat{y}_i) + (1-y_i)\log(1-\hat{y}_i)) \quad (6)$$

A typical example for a regression loss is the mean square error or $L_2$ loss. As the name suggests, mean square error is measured as the average of the squared difference between predictions and actual observations. It is only concerned with the average magnitude of error irrespective of their direction. However, due to squaring, predictions which are far away from actual values are penalized heavily in comparison to less deviated predictions. Plus MSE has nice mathematical properties which makes it easier to calculate gradients. Its formulation is as follows:

$$MSE = \frac{1}{n} \cdot \sum_{i=1}^{n}(y_i - \hat{y}_i)^2$$

The following documents contain information on the functioning of convolutional neural networks:
- I. Goodfellow, Y. Bengio, and A. Courville, "Deep learning, chapter convolutional networks." http://www.deeplearningbook.org, 2016.
- J. Wu, "Introduction to convolutional neural networks." https://pdfs.semanticscholar.org/450c/a19932fcef1ca6d0442cbf52fec38fb9d1e5.pdf. "Common loss functions in machine learning." https://towardsdatascience.com/common-loss-functions-in-machine-learning-46af0ffc4d23. Accessed: 2019-08-22.
- Alex Krizhevsky, Ilya Sutskever, and Geoffrey E. Hinton, "Imagenet classification with deep convolutional neural networks." http://papers.nips.cc/paper/4824-imagenet-classification-with-deep-convolutional-neural-networks.pdf.
- S. Ren, K. He, R. Girshick, and J. Sun, "Faster r-cnn: Towards real-time object detection with region proposal networks." https://arxiv.org/pdf/1506.01497.pdf.
- S.-E. Wei, V. Ramakrishna, T. Kanade, and Y. Sheikh, "Convolutional pose machines." https://arxiv.org/pdf/1602.00134.pdf.
- Jonathan Long, Evan Shelhamer, and Trevor Darrell, "Fully convolutional networks for semantic segmentation." https://www.cv-foundation.org/openaccess/content_cvpr_2015/papers/Long_Fully_Convolutional_Ne tworks_2015_CVPR_paper.pdf.

The learning algorithm uses for example a random forest classifier. According to Antonio Criminisi, Jamie Shotton, Ender Konukoglu: "Decision Forests: A Unified Framework for Classification, Regression, Density Estimation, Manifold Learning and Semi-Supervised Learning" (2011), https://www.microsoft.com/en-us/research/wp-content/uploads/2016/02/CriminisiForests_FoundTrends_2011.pdf, random forests can be explained as follows:

"Random forests are an ensemble learning method for classification or regression that operates by constructing a multitude of decision trees at training time and outputting the class that is the mode of the classes (classification) or mean prediction (regression) of the individual trees.

The basic building block of a random forest is a single decision tree. A decision tree is a set of questions organized in a hierarchical manner and represented graphically as a tree. A decision tree estimates an unknown property (the "label") of an object by asking successive questions about its known properties (the so-called "features"). Which question to ask next depends on the answer of the previous question and this relationship is represented graphically as a path through the tree which the object follows. The decision is then made based on the terminal node on the path (the so-called "leaf-node"). Each question corresponds to an internal node (so-called "split-node") of the tree.

Each split node has associated to it a so-called test function. We formulate a test function at a split node j as a function with binary outputs $$h(v, \theta_j): \mathcal{F} \times \mathcal{T} \rightarrow \{0,1\}$$

where 0 and 1 can be interpreted as "false" and "true" respectively, $\theta_j \in \mathcal{T}$ denote the parameters of the test function at the j-th split node. $\mathcal{T}$ v thereby is the current object ("data point") denoted by a vector $v = (x_1, x_2, \ldots, x_d) \in \mathcal{F}$, where the components $x_i$ represent some attributes of the data point (the features), all of which form the Feature space $\mathcal{F}$.

In the simplest form, the test function is a linear model which selects one feature axis in the feature space and classifies each data point according to whether the value of the respective feature is below or above a learnable threshold. Other more complex, non-linear test functions are possible.

In order to train a decision tree, a set of training data points is used for which both the features as well as the desired label are known. The goal of the training is to automatically learn suitable test functions at all the split-nodes which are best suited to determine the label from the features of a data point. Later on, such a trained decision tree can then be evaluated for a new data point with unknown label by sending the data point through the trained tree based on its features.

For understanding the training procedure, it is useful to denote subsets of training points as being associated with different tree branches. For instance $S_1$ denotes the subset of training points reaching node 1 (nodes are numbered in breadth-first order starting from 0 for the root F, and $S_1^L$, $S_1^R$ denote the subsets going to the left and to the right children of node 1, respectively.

The training takes care of selecting the type and parameters of the test function $h(v, \theta_j)$ associated with each split node (indexed by j) by optimizing a chosen objective function defined on an available training set.

The optimization of the split functions proceeds in a greedy manner. At each node j, depending on the subset of the incoming training set $S_j$ we learn the function that "best" splits $S_j$ into $S_j^R$ and $S_j^L$. This problem is formulated as the maximization of an objective function at that node $$\Theta_j^* = \arg\max_{\theta_j \in \mathcal{T}} I_j$$

with $$I_j = I(S_j, S_j^L, S_j^R, \theta_j)$$

$$S_j^L = \{(v,y) \in S_j | h(v, \theta_j) = 0\}$$

$$S_j^R = \{(v,y) \in S_j | h(v, \theta_j) = 1\}$$

As before, the symbols $S_j$, $S_j^L$, $S_j^R$ denote the sets of training points before and after the spit. The objective function is of an abstract form here. Its precise definition and the meaning of "best" depends on the task at hand (e.g., supervised or not, continuous or discrete output). For instance, for binary classification, the term "best" can be defined as splitting the training subset $S_j$ such that the resulting child nodes are as pure as possible, that is, containing only training points of a single class. In this case the objective function can, for instance, be defined as the information gain.

During training we also need to optimize the tree structure (shape). Training starts at the root node, j=0, where the optimum split parameters are found as described earlier. Thus, we construct two child nodes, each receiving a different disjoint subset of the training set. This procedure is then applied to all the newly constructed nodes and the training phase continues. The structure of the tree depends on how and when we decide to stop growing various branches of the tree. Diverse stopping criteria can be applied. For example it is common to stop the tree when a maximum number of levels D has been reached. Alternatively, one can impose a minimum value of the maximum $\max_{\theta_j} I_j$, in other words we stop when the sought for attributes of the training points within the leaf node are similar to one another. Tree growing may also be stopped when a node contains too few training points. Avoiding growing full trees has been demonstrated to have positive effects in terms of generalization.

During training, randomness is injected into the trees: Instead of optimizing over the whole parameter space of the test functions, when training at the j-th node we only make available a small random subset $\mathcal{T}_j \in \mathcal{T}$ of parameter values. Thus, under the randomness model training a tree is achieved by optimizing each split node j by $$\Theta_j^* = \arg \max_{\theta_j \in \mathcal{T}_j} I_j.$$

Due to this randomized setup, multiple decision trees can later be trained in parallel, each exploiting a different sets of properties from a data point.

At the end of the training phase we obtain: (i) the (greedily) optimum weak learners associated with each node, (ii) a learned tree structure, and (iii) a different set of training points at each leaf.

After training, each leaf node remains associated with a subset of (labelled) training data. During testing, a previously unseen point traverses the tree until it reaches a leaf.

Since the split nodes act on features, the input test point is likely to end up in a leaf associated with training points which are all similar to itself. Thus, it is reasonable to assume that the associated label must also be similar to that of the training points in that leaf. This justifies using the label statistics gathered in that leaf to predict the label associated with the input test point.

In the most general sense the leaf statistics can be captured using the posterior distributions $$p(c|v) \text{ and } p(y|v),$$

where c and y represent the discrete or continuous labels, respectively. v is the data point that is tested in the tree and the conditioning denotes the fact that the distributions depend on the specific leaf node reached by the test point. Different leaf predictors can be used. For instance, a Maximum A-Posteriori (MAP) estimate may be obtained as $c^* = \arg \max_c p(c|v)$, in the discrete case.

Based on the above construction principle for decision trees, we can now proceed to decision forests, also called random forests:

A random decision forest is an ensemble of randomly trained decisions trees. The key aspect of the forest model is the fact that its component trees are all randomly different from one another. This leads to decorrelation between the individual tree predictions and, in turn, results in improved generalization and robustness.

In a forest with T trees we use the variable $t \in \{1, \ldots, T\}$ to index each component tree. All trees are trained independently (and possibly in parallel). During testing, each test point v is simultaneously pushed through all trees (starting at the root) until it reaches the corresponding leaves. Tree testing can also often be done in parallel, thus achieving high computational efficiency on modern parallel CPU or GPU hardware. Combining all tree predictions into a single forest prediction may be done by a simple averaging operation. For instance, in classification $$p(c|v) = \frac{1}{T} \sum_{t=1}^{T} p_t(c|v),$$

where $p_t(c|v)$ denotes the posterior distribution obtained by the tth tree. Alternatively, one could also multiply the tree outputs together (though the trees are not statistically independent)

$$p(c|v) = \frac{1}{Z} \prod_{t=1}^{T} P t(c|v)$$

with the partition function Z ensuring probabilistic normalization."

Definitions

In this section, definitions for specific terminology used in this disclosure are offered which also form part of the present disclosure.

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term computer includes a server resource. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (VWWV)

and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a virtual reality device or an augmented reality device (also referred to as virtual reality glasses or augmented reality glasses) which can be used as "goggles" for navigating. A specific example of such augmented reality glasses is Google Glass (a trademark of Google, Inc.). An augmented reality device or a virtual reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. An example of such a digital lightbox is Buzz®, a product of Brainlab AG. The monitor may also be the monitor of a portable, for example handheld, device such as a smart phone or personal digital assistant or digital media player.

The invention also relates to a computer program comprising instructions which, when on the program is executed by a computer, cause the computer to carry out the method or methods, for example, the steps of the method or methods, described herein and/or to a computer-readable storage medium (for example, a non-transitory computer-readable storage medium) on which the program is stored and/or to a computer comprising said program storage medium and/or to a (physical, for example electrical, for example technically generated) signal wave, for example a digital signal wave, such as an electromagnetic carrier wave carrying information which represents the program, for example the aforementioned program, which for example comprises code means which are adapted to perform any or all of the method steps described herein. The signal wave is in one example a data carrier signal carrying the aforementioned computer program. The invention also relates to a computer comprising at least one processor and/or the aforementioned computer-readable storage medium and for example a memory, wherein the program is executed by the processor.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing (and e.g. outputting) the data by means of a computer and for example within the framework of the method in accordance with the invention.

A step of "determining" as described herein for example comprises or consists of issuing a command to perform the determination described herein. For example, the step comprises or consists of issuing a command to cause a computer, for example a remote computer, for example a remote server, for example in the cloud, to perform the determination. Alternatively or additionally, a step of "determination" as described herein for example comprises or consists of receiving the data resulting from the determination described herein, for example receiving the resulting data from the remote computer, for example from that remote computer which has been caused to perform the determination. The meaning of "acquiring data" also for example encompasses the scenario in which the data are received or retrieved by (e.g. input to) the computer implemented method or program, for example from another program, a previous method step or a data storage medium, for example for further processing by the computer implemented method or program. Generation of the data to be acquired may but need not be part of the method in accordance with the invention. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

The n-dimensional image of a body is registered when the spatial location of each point of an actual object within a space, for example a body part in an operating theatre, is assigned an image data point of an image (CT, MR, etc.) stored in a navigation system.

BRIEF DESCRIPTION OF THE DRAWINGS

In the following, the invention is described with reference to the appended figures which give background explanations and represent specific embodiments of the invention.

The scope of the invention is however not limited to the specific features disclosed in the context of the figures, wherein.

DESCRIPTION OF EMBODIMENTS

Figure 1:
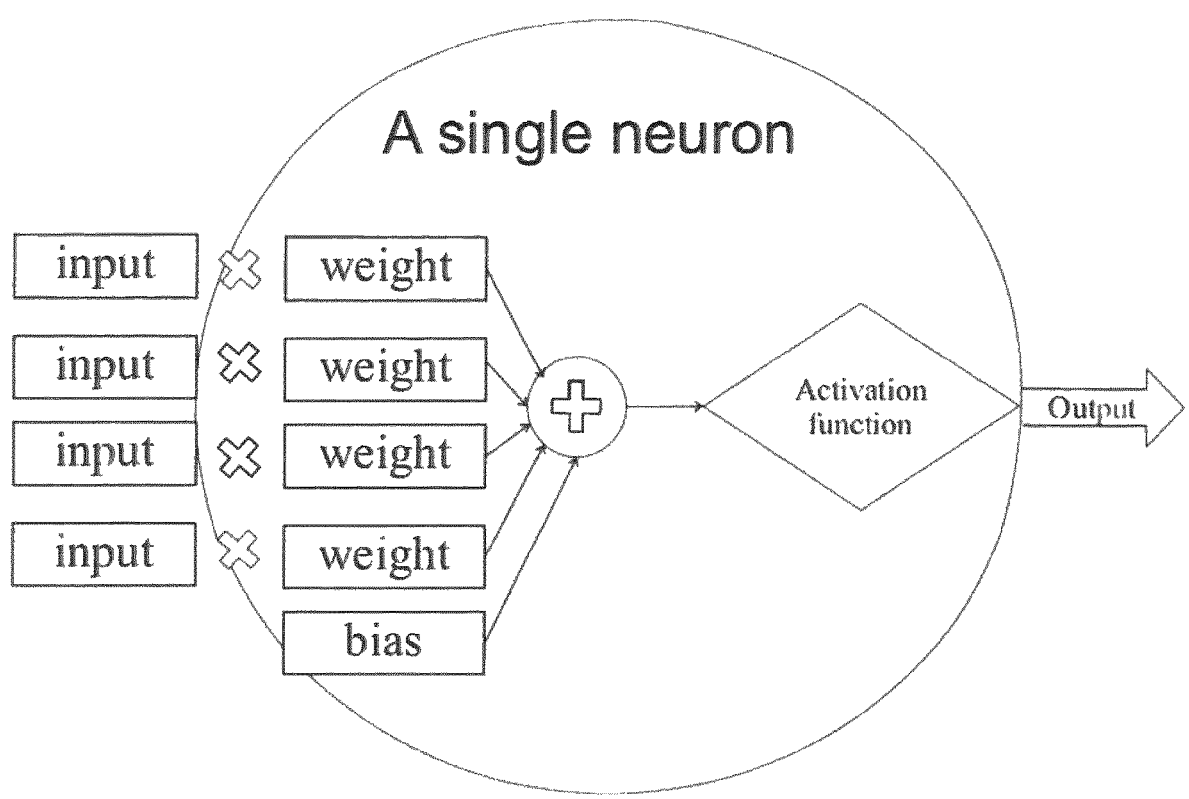
FIG. 1 is an illustration of the functionality of a single neuron of a neural network.

FIG. 1 illustrates the functionality of a neuron of the learning algorithm used in the methods according to the first and second aspect.

Figure 2:
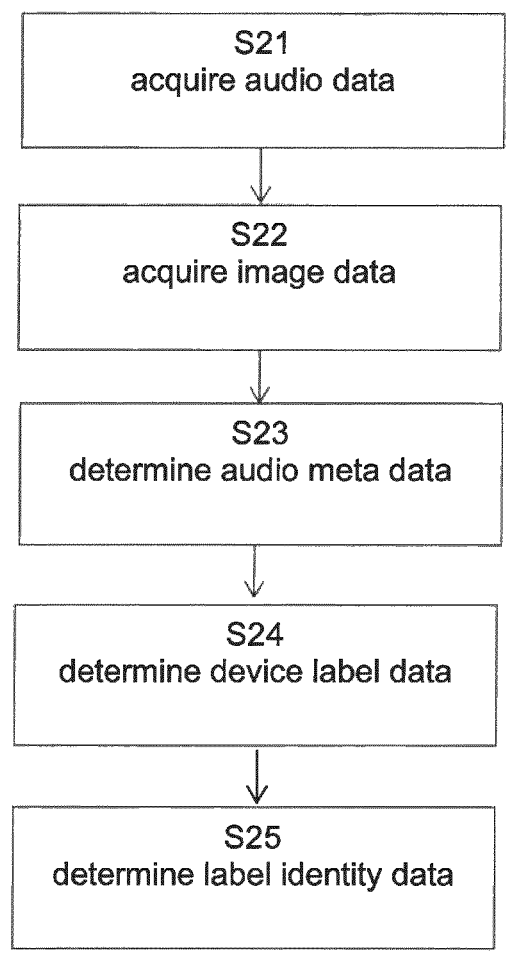
FIG. 2 illustrates the basic steps of the method according to the first aspect.

FIG. 2 illustrates the basic steps of the method according to the first aspect, in which step S21 encompasses acquisition of the audio data, step S22 encompasses acquisition of the image data and subsequent step S23 encompasses determination of the audio meta data. Then, the device label data is determined in step S24 and the label identity data is determined in step S25.

Figure 3:
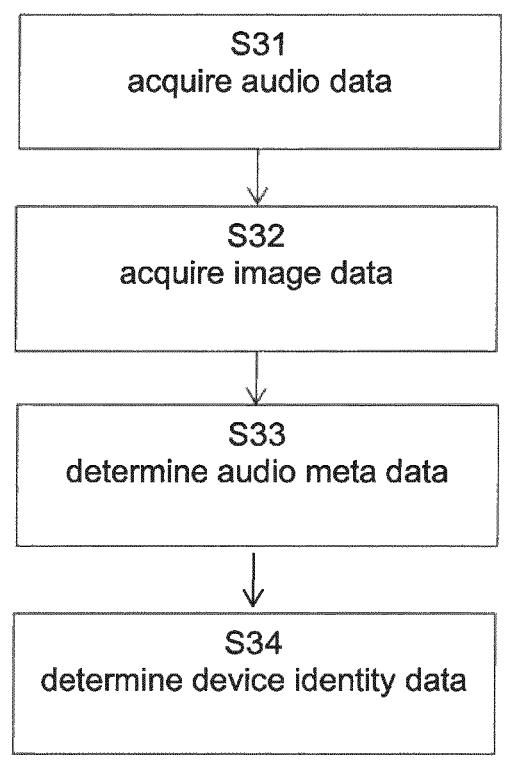
FIG. 3 illustrates the basic steps of the method according to the second aspect.

FIG. 3 illustrates the basic steps of the method according to the second aspect, in which step S31 encompasses acquisition of the audio data, step S32 encompasses acquisition of the image data, step S33 determines the audio meta data and subsequent step S34 encompasses determination of the device identity data.

Figure 4:
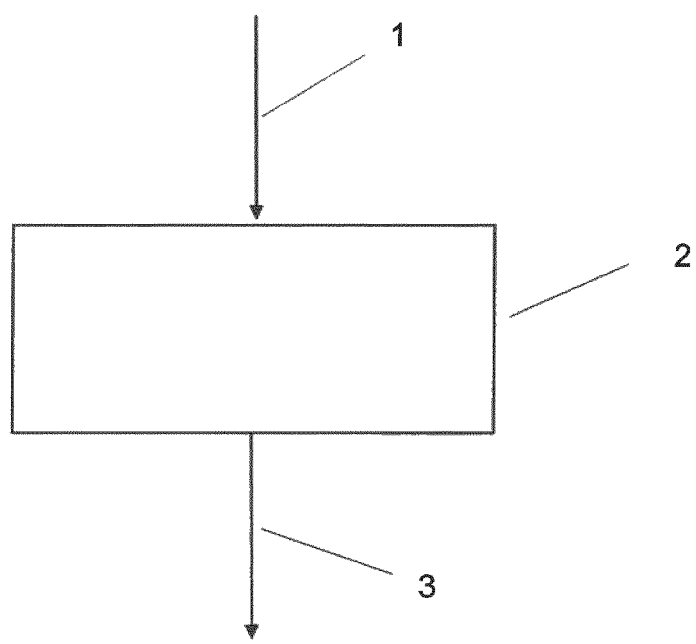
FIG. 4 shows an embodiment of the present invention, specifically the method according to the first aspect.

FIG. 4 illustrates an embodiment of the present invention that includes all essential features of the invention. In this embodiment, the entire data processing which is part of the method according to the first aspect is performed by a computer 2. Reference sign 1 denotes the input of data acquired by the method according to the first aspect into the computer 2 and reference sign 3 denotes the output of data determined by the methods according to the first and second aspects.

Figure 5:
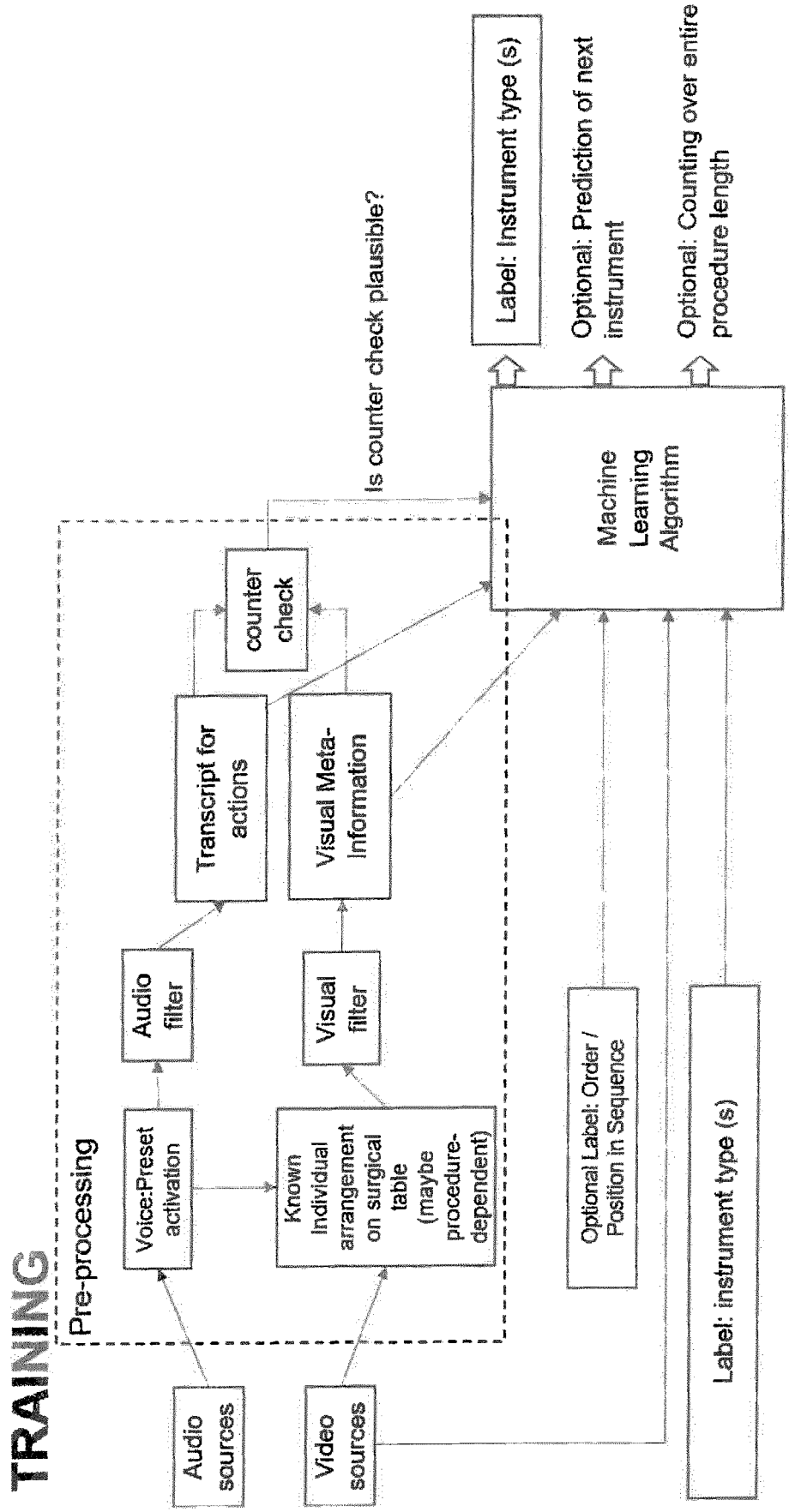
FIG. 5 is a schematic illustration of an embodiment of the process of training the learning algorithm according to the method according to the first aspect.

FIG. 5 shows the process of training the learning algorithm in an embodiment of the method according to the first aspect. The embodiment includes adding a contextual voice and audio preprocessing component in accordance to a video input signal and to use it for the machine learning algorithm. This generated transcript is then used for instrument identification.

The illustrated embodiment includes the following steps:
1. Audio source(s) and video source(s) are used as input. Audio and video sources exemplifying the audio data and the image data may be recorded from various angles of the room in order to capture a three-dimensional context. These input sources are pre-processed before they are used to feed the machine learning algorithm (see below step 3 and FIG. 5).
2. Together with the raw video images, the depicted instrument types need to be provided with a label for training. An optional input parameter to the machine learning algorithm is the order of the instruments which is found in the video. It reflects a procedure specific parameter which can be valuable for instrument identification during a certain procedure.
3. The data is then pre-processed to make it usable by the machine learning algorithm in the context of tracking a medical device using a transcript. The main goal of the preprocessing component is to generate a transcript out of the two input types (audio and video). The transcript is characterized by the synchronization of certain audio snippets with their matching video events. The transcript therefore encodes matching video actions with their audio.

On the way to the transcript, user specific voice is used to select an instrument arrangement suitable for the procedure. As a consequence, the individual instrument arrangement on the surgical table is known by the system. Instrument arrangements can be seen as presets to identify the location of certain instruments.

Filter operations are performed on the audio and video data before they are combined by the transcript.
Filtering of audio includes, but is not limited to:
voice detection
filtering out non-keywords (e.g. "please")
filtering out of patient health information
translation (algorithm can be used independently of language spoken)
noise cancellation (directional or multiple microphones to filter out words spoken towards a sterile tray, from surgeon or towards instrument nurse)
a combination of the above (if two instruments are mentioned at once, they are used for separate events in the video)
filtering of video, to provide additional visual meta-information:
hand movements (which part of the instrument is touched)
instrument contamination (which part of the instrument is contaminated)
background (instrument can be held above area, e.g. checkerboard pattern with labels)
Through the combination of the described steps, context sensitive transcript information becomes available and is used as input for the machine learning Algorithm. Thus, clearly assignable events regarding the participating instruments are available.
A multimodal countercheck is performed in order to inspect the credibility of the encountered events. This result is also provided to the machine learning algorithm.
4. Instruments are thereby identified through the training of the machine learning algorithm. The instrument type is the output of the algorithm.

Another result is the prediction of the next instrument.
With the knowledge about recognized events, the entirety of instruments is counted over the entire procedure length.

Figure 6:
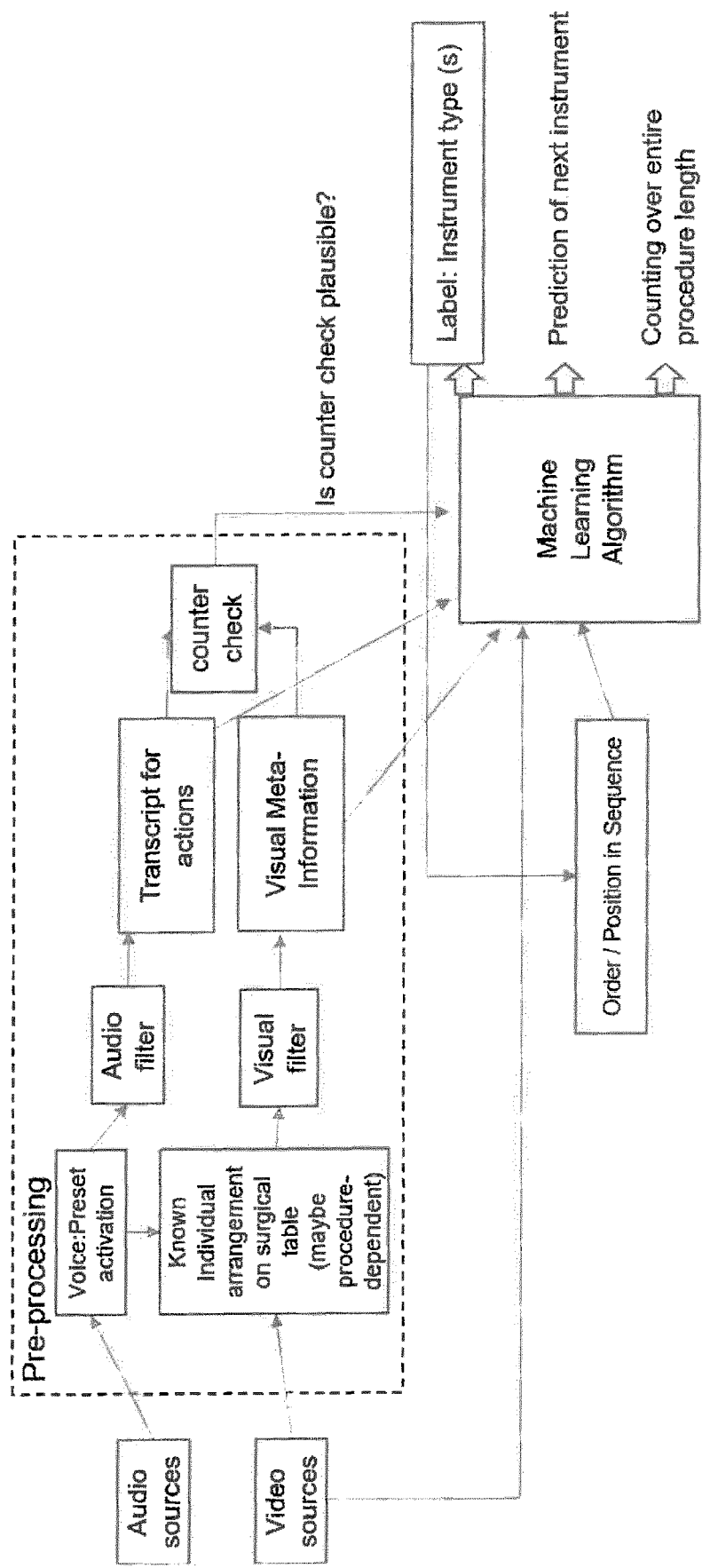
FIG. 6 is a schematic illustration of an embodiment of the process of testing the trained learning algorithm according to the method according to the second aspect.

FIG. 6 shows the process of using (also called testing) the learning algorithm in an embodiment of the method according to the second aspect. The audio and video sources are pre-processed as for the training process and then fed into the trained machine learning algorithm to output the information to be generated by the trained machine learning algorithm. The same designations in FIGS. 5 and 6 denote the same technical features and/or functionalities.

Figure 7:
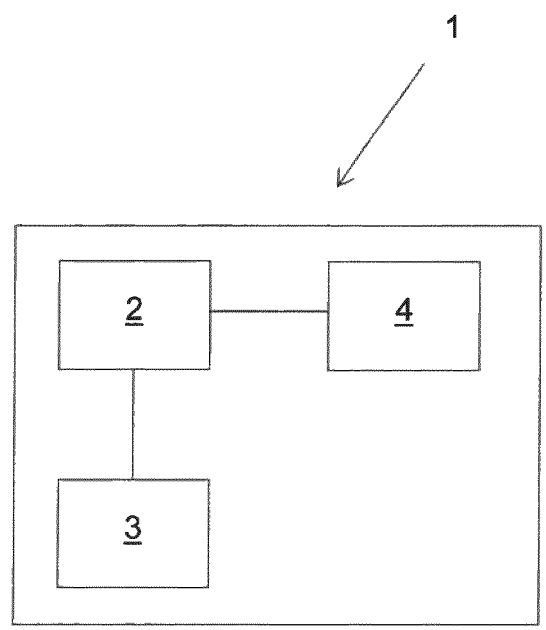
FIG. 7 is a schematic illustration of the system according to the fifth aspect.

FIG. 7 is a schematic illustration of the medical system 4 according to the eighth aspect. The system is in its entirety identified by reference sign 4 and comprises a computer 5, an electronic data storage device (such as a hard disc) 6 for storing at least the patient data and an imaging device 7. The components of the medical system 4 have the functionalities and properties explained above with regard to the eighth aspect of this disclosure.

The invention is associated with the following technical effects:
1. The generation of the transcript allows for more generic training of the learning algorithm.
2. The data pre-processing allows for more generic data input.
3. Using the learning algorithm and the consideration of the order of medical devices each allow for a context-sensitive identification of the medical device.

The invention claimed is:

1. A computer-implemented method of training a learning algorithm to determine an identity of a medical device, comprising:
acquiring training audio data which describes an audio identifier which describes the identity of the medical device;
acquiring training image data which describes a series of temporally subsequent digital images comprising a visual identifier which describes the identity of the medical device;
determining training audio meta data based on the training audio data, wherein the training audio meta data describes a training transcript of the audio identifier;
acquiring device label data which describes a label associated with at least one of the audio identifier and the visual identifier, wherein the label describes the identity of the medical device; and
determining label identity data which describes model parameters of the learning algorithm for establishing a relation between the visual identifier and the audio identifier and the label, wherein the label identity data is determined by inputting the training audio meta data and the device label data into a function which establishes the relation.

2. The computer-implemented method according to claim 1, further comprising a step in which
training visual meta data is acquired which describes a use state of the medical device in each of the digital images, wherein the label identity data is determined by inputting the training visual meta data into the function which establishes the relation.

3. The computer-implemented method according to claim 1, further comprising a step in which a training visual meta data is determined based on the training image data, wherein the training transcript and the visual identifier are time-synchronized and the training transcript is associated with the visual identifier, wherein the label identity data is determined by inputting the training visual meta data into the function.

4. The computer-implemented method according to claim 1, further comprising a step in which
medical device order data describing a predetermined order of use of a plurality of medical devices is acquired,
wherein the label identity data is determined based on the medical device order data.

5. The computer-implemented method according to claim 4, wherein the label identity data describes a prediction of another medical device to be used.

6. The computer-implemented method according to claim 5 wherein the device identity data describes another medical device to be used.

7. The computer-implemented method according to claim 1, wherein the label identity data describes a counter indicating use of the medical device.

8. The computer-implemented method according to claim 7 wherein the device identity data describes a value of the counter.

9. The computer-implemented method according to claim 1, wherein a check is conducted to determine on the basis of predetermined statistical information whether the training transcript describes the same medical device as the visual identifier.

10. The computer-implemented method according to claim 1, wherein the learning algorithm comprises or consists of a machine learning algorithm.

11. The computer-implemented method according to claim 1, wherein the learning algorithm comprises or consists of a convolutional neural network.

12. The computer-implemented method according to claim 1, wherein the model parameters define learnable parameters of the learning algorithm.

13. A computer-implemented method of determining a relation between a visual identifier, and audio identifier and a label, the visual identifier, audio identifier and label identifying a medical device, the method comprising:
acquiring audio data which describes the audio identifier;
acquiring image data which describes a series of temporally subsequent digital images comprising the visual identifier;
determining audio meta data based on the audio data, wherein the audio meta data describes a transcript of the audio identifier, wherein the transcript and the image data are time-synchronized and the audio identifier is associated with the visual identifier; and
determining device identity data which describes a relation between the visual identifier and the audio identifier, wherein the device identity data is determined by inputting the audio meta data into a function which establishes the relation, the function being part of a trained learning algorithm.

14. The computer-implemented method according to claim 13, wherein the learning algorithm has been trained by
determining visual meta data is determined based on the image data, wherein the visual meta data describes a use state of the medical device in each of the digital images,
wherein the device identity data is determined by inputting the visual meta data into the function.

15. The computer-implemented method according to claim 13, wherein the digital images are still images or video images.

16. The computer-implemented method according to claim 13, wherein the audio identifier comprises a phonetic signal.

17. The computer-implemented method according to claim 13, wherein the phonetic signal is a human voice signal and wherein the transcript and/or a training transcript is generated by at least one of lingually translating words described by the voice signal, filtering out a keyword described by the voice signal, filtering out a patient identifier described by the voice signal, filtering out health information described by the voice signal, cancelling noise included in the voice signal, determining that a predetermined combination of keywords is described by the voice signal.

18. The computer-implemented method according to claim 13, wherein the visual identifier is an image rendering of the medical device in the digital images.

19. The computer-implemented method according to claim 13, wherein the transcript comprises at least one of information about the phonetic signal, the phonetic signal, a string variable, information on a direction of origin of the phonetic signal, information about a person causing the phonetic signal.

20. The computer-implemented method according to claim 13 wherein
audio confirmation data is acquired which describes a human voice signal indicating an identity of the medical device and wherein
the device identity data is determined based on the audio confirmation data.

21. The computer-implemented method according to claim 13, wherein at least one of the digital images comprises an image rendering of the medical device and a support unit for supporting the medical device, the method further comprising a step of determining a image identifier based comparing a relative position in the at least one digital image between the medical device and the device support unit to a predetermined relative position between the medical device and the device support unit.

22. The computer-implemented method according to claim 13, wherein the use state is defined by at least one of the following:
a state of cleanliness of the medical device;
a hand movement of a hand of a user rendered in the digital image;
a relative position between a hand of a user rendered in at least one of the digital images and the medical device rendered in the at least one of the digital images;
a relative position between a rendering in at least one of the digital images of information coding an identity of the medical device and a rendering in at least one of the digital images of the medical device, wherein the information coding the identity is non-anatomical information; and
a geometry of the medical device.

23. A system for determining a relation between a visual identifier, and audio identifier and a label, the visual identifier, audio identifier and label identifying a medical device, the system comprising:
at least one computer having at least one processor;
at least one electronic data storage device storing image data and audio data;
a non-transitory program storage medium,
the non-transitory program storage medium containing instructions to cause the at least one processor to:
acquire audio data which describes the audio identifier;

acquire image data which describes a series of temporally subsequent digital images comprising the visual identifier;

determine audio meta data based on the audio data, wherein the audio meta data describes a transcript of the audio identifier, wherein the transcript and the image data are time-synchronized and the audio identifier is associated with the visual identifier;

determine device identity data which describes a relation between the visual identifier and the audio identifier, wherein the device identity data is determined by inputting the audio meta data into a function which establishes the relation, the function being part of a trained learning algorithm;

wherein the at least one computer is operably coupled to the at least one electronic data storage device for acquiring, from the at least one electronic data storage device, the image data and the audio data, and for storing, in the at least one electronic data storage device, at least the device identity data; and the non-transitory program storage medium for acquiring, from the non-transitory program storage medium, the data defining the model parameters and architecture of the trained learning algorithm.

\* \* \* \* \*